United States Patent

[11] 3,599,533

| | | |
|---|---|---|
| [72] | Inventor | Russell W. Anthony<br>Harper Woods, Mich. |
| [21] | Appl. No. | 837,098 |
| [22] | Filed | June 27, 1969 |
| [45] | Patented | Aug. 17, 1971 |
| [73] | Assignee | Lear Siegler, Inc.<br>Santa Monica, Calif. |

[54] BROACHING MACHINE
10 Claims, 6 Drawing Figs.

[52] U.S. Cl..................................................... 90/96,
90/41, 74/410
[51] Int. Cl........................................................B23d 41/08,
F16h 57/00
[50] Field of Search........................................... 90/67, 95,
96, 97, 63, 35, 41, 46, 47; 74/410

[56] References Cited
UNITED STATES PATENTS
| | | | | |
|---|---|---|---|---|
| 1,335,871 | 4/1920 | Blanchard..................... | | 90/95 |

FOREIGN PATENTS
| | | | | |
|---|---|---|---|---|
| 814,036 | 5/1959 | Great Britain................ | | 90/96 |

*Primary Examiner*—Gil Weidenfeld
*Attorney*—Whittemore, Hulbert & Belknap

ABSTRACT: A broaching machine having relatively reciprocable work and broach-supporting members comprising a pair of racks and pinions for effecting reciprocation of one member, a drive motor connected to a spline shaft, a pair of rigidly interconnected helical gears on said spline shaft, and gearing connecting each of said gears to one of said pinions so as to effect equal division of the load on each of said pinions.

INVENTOR.
RUSSELL W. ANTHONY

INVENTOR.
RUSSELL W. ANTHONY
BY Whittemore
Hulbert & Belknap
ATTORNEYS 3,599,533

BROACHING MACHINE

BRIEF SUMMARY OF THE INVENTION

The present machine is designed primarily for broaching gears and comprises a stationary generally tubular broach support in which are provided a multiplicity of broach rings. A work slide including a post on which work pieces are mounted is mounted for vertical movement to effect a broaching stroke on upward movement of the gears through the broach support.

In the past relative reciprocations between the broach and work support has often been provided by hydraulic piston and cylinder devices, in which case the practice has in general been to provide the axis of the cylinder in alignment with the axis of the broach, resulting in a machine of substantial height.

The present machine substitutes electric motor drive operated through racks and pinions, one set of racks and pinions being located at each side of the broach to provide a balanced condition. The gearing connecting the motor and the pinions of the rack and pinion devices includes two helical gears of opposite hand fixed together and slidable longitudinally on a spline shaft. This permits the double helical gear to move axially on the spline shaft to divide the load transmitted to the two pinions.

The present machine is further characterized in that the cutting stroke is accomplished by energization of an AC electric motor which need not be reversible and which is connected to and disconnected from the drive mechanism by suitable clutch means. Specifically, the arrangement is such that this relatively powerful motor effects vertical upward movement of a slide on the cutting stroke. A separate substantially smaller electric motor is connected to the drive means for effecting the downward movement of the slide, which is of course helped by gravity.

DETAILED DESCRIPTION

Figure 2:
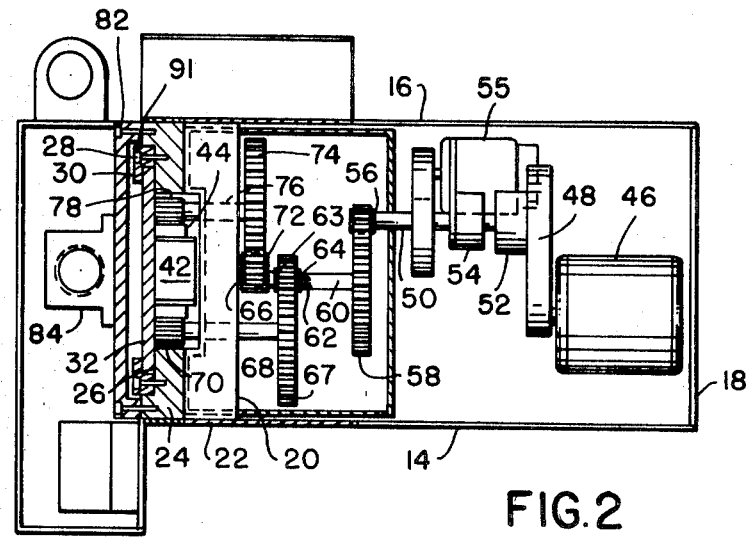
FIG. 2 is a sectional view of the machine, taken substantially on the line 2-2, FIG. 1, looking in the direction of the arrows.
Figure 1:
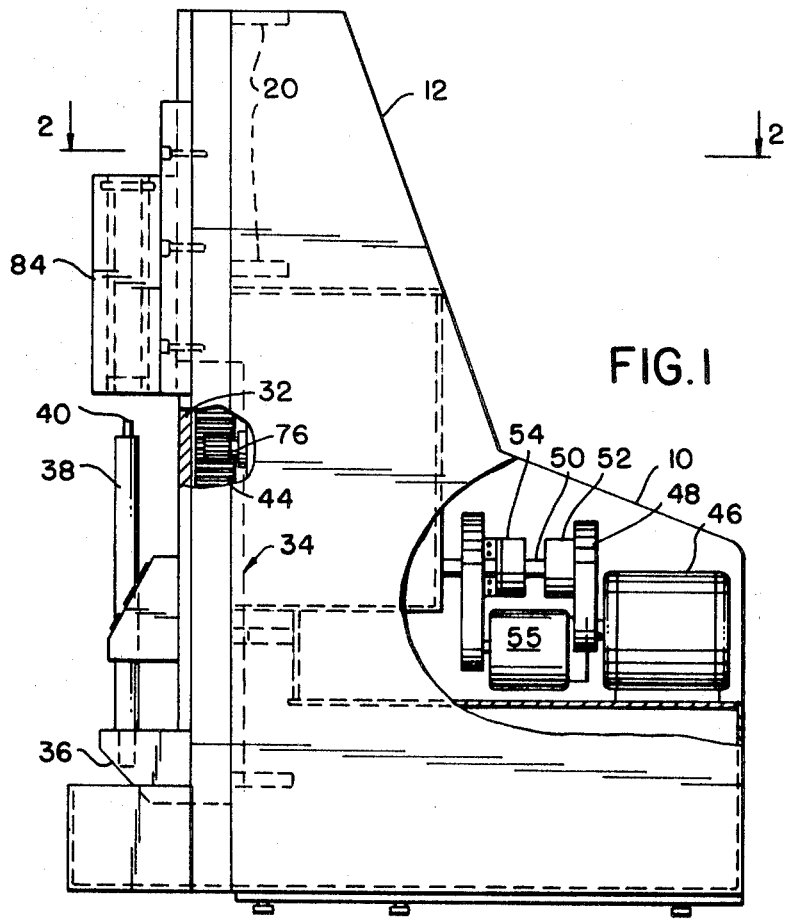
FIG. 1 is a side elevation of the broaching machine.
Figure 4:
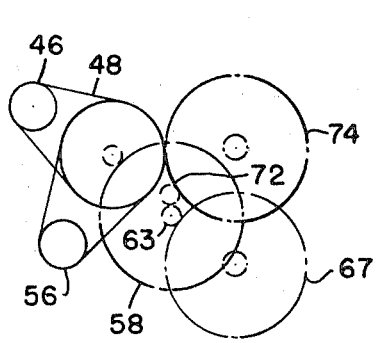
FIG. 4 is a diagram illustrating the drive connections.

The broaching machine comprises a base 10 having a column portion 12. As best seen in FIG. 2 the base comprises side plates 14 and 16 and back plates, one of which is indicated at 18. The forward edges of the side plates 14 and 16 are interconnected by transverse plates 20 the ends of which are welded to the side plates 14 and 16 as indicated at 22. Suitably connected by welding to the forward end surfaces of the plates 20 are vertical bars 24 each of which is provided with a recess 26 at its forward edge. Mounted within the recess and secured to the bars 24 by suitable means such as the screws 28, are gibs 30 which provide ways for supporting and guiding a plate 32 for vertical movement. The plate 32 is connected to a work support slide 34 having adjacent its lower end a forwardly extending rigid projection 36 on which is mounted a vertically upwardly extending post 38 having a reduced portion 40 at its upper end for receiving one or more gear blanks to be broached, as will subsequently be described.

Extending rearwardly from the guide plate 32 forming a part of the work slide 34 is a vertically elongated projection 42 provided at opposite sides thereof with elongated vertically extending racks 44.

Mounted within the hollow interior of the base 10 is a first driving motor 46 which is an AC motor of substantial power but which need not be reversible. The motor 46 is connected to gearing which will presently be described, for effecting vertical upward movement of the work support 34 so as to cause work pieces carried thereby to have teeth broached on the periphery thereof. The motor 46 is connected by belting 48 to a shaft 50 through a clutch 52 so that the motor may be operated in a single direction while being capable of disconnection from the shaft to permit reverse rotation of the shaft by other means. The shaft 50 also is provided with a brake 54 to arrest rotation thereof and to hold the mechanism connected thereto in position when the clutch 52 is disconnected. Also connected to the shaft 50 is a second smaller motor 55 which is energized to effect reverse rotation of the shaft 50 when the motor 46 is deenergized. The shaft 50 has a pinion 56 carried thereby which meshes with a gear 58 connected to a shaft 60, the shaft 60 being splined as indicated at 62. Mounted on the splined portion of the shaft 60 is a double driving gear 63 having driving gear portions 64 and 66 rigidly connected together. The drive gear portion 64 is in mesh with a much larger gear 67 which in turn is connected to a shaft 68 carrying a pinion 70 which is in mesh with one of the racks 44. The other drive gear portion 66 is in mesh with an idler pinion 72 which in turn is in mesh with a large gear 74 connected to a shaft 76 and carrying at its other end the pinion 78 in mesh with the other rack 44.

In order to insure smooth operation of the work slide 34, it is essential that each of the pinions 70 and 78 transmit approximately half of the driving force to the racks 44.

In order to accomplish division of the load so that approximately half is applied to each of the racks 44, two alternative arrangements are possible. These are diagrammatically illustrated in FIGS. 5 and 6.

Figure 5:
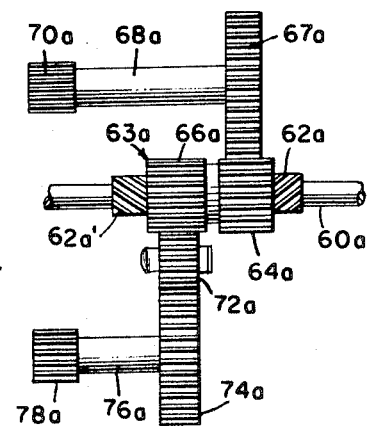
FIGS. 5 and 6 are diagrammatic Figures illustrating alternative arrangements.
Figure 3:
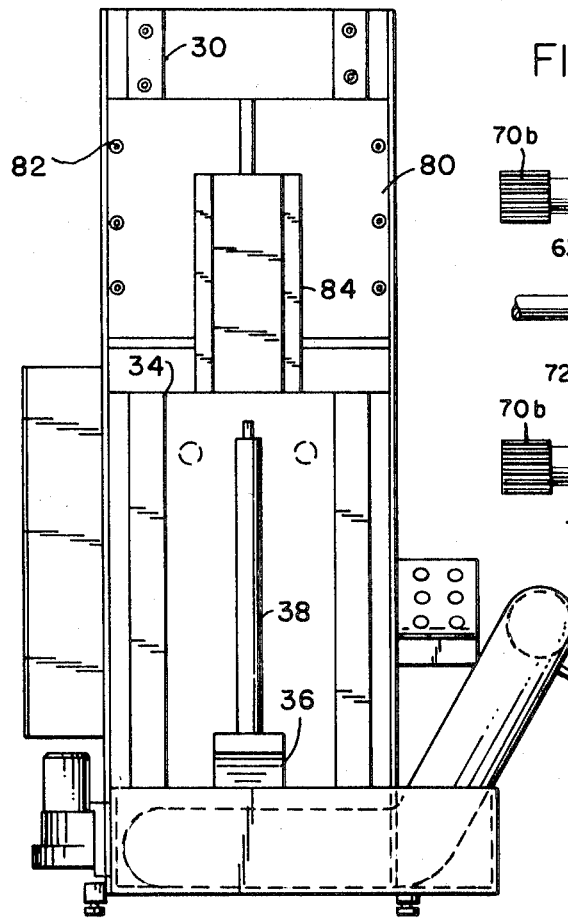
FIG. 3 is a front elevational view of the machine.

In FIG. 5 the shaft 60a is provided with helically splined means 62a and 62a', one of which may be integral with the shaft. It will be observed that the splined portion 62a is a left-hand helical spline whereas the portion 62a' is a right hand helical spline. The interior of the double gear 63a has correspondingly splined portions at opposite ends, the portion within the double gear portion 64a being a left-hand helical spline and the portion within the left-hand double gear portion 66a being a right-hand helical spline. The gear portion 64a is in mesh with a larger gear 67a carried by the shaft 68a and driving the pinion 70a which is in mesh with one of the racks. The other double gear portion 66a is in driving relation through an idler 72a with a large gear 74a which is carried by the shaft 76a and drives the pinion 78a in mesh with the other rack.

The teeth of the gear portions 64a and 66a as well as the teeth of the idler 72a and gears 67a and 74a, are all spur.

It will be obvious that axial movement of the double gear 63a will transfer the load to one or the other of the pinions 70a or 78a and that the double gear will automatically assume the intermediate position under load which will transmit substantially equal torque to both of the pinions. This of course results in smooth sliding movement of the work support slide 34.

Figure 6:
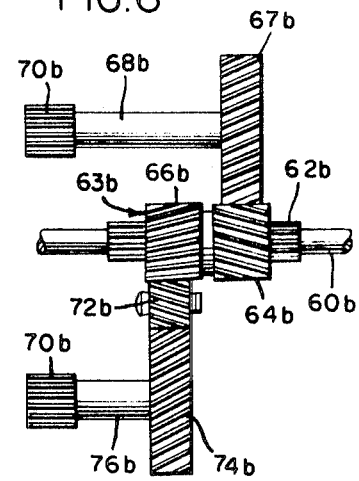

Instead of providing spur gears and helical splines, as illustrated in FIG. 5, the spline which in FIG. 6 is illustrated at 62b is straight or spur, and the double gear portions 64b and 66b are of opposite hand. This will again cause the double gear, which in this Figure is designated 63b, to shift axially into the position which causes it to transmit substantially equal load to the two pinions.

The parts in FIG. 6 are given the same reference numerals as in FIG. 5, but the parts are identified by the letter b.

Since these pinions drive racks which are positioned at opposite sides of the centerline and directly adjacent the guide plate 32 forming a part of the work support, the work slide is moved smoothly in an upwardly vertical broaching stroke and in a downward return stroke. The vertical bars 24 are tied together at the top by a transversely extending bridge 80 which is bolted as indicated at 82 to the bars 24. The bridge 80 carries a broach housing 84 of hollow internal configuration and adapted to receive a multiplicity of broach rings therein. The detailed construction of the broach housing and broach rings is omitted since it may be generally similar to that shown in Psenka patent U.S. Pat. No. 3,332,129 owned by the assignee herein.

What I claim as my invention is:

1. A machine tool having a base, rectilinear guideways on said base, a slide mounted on said ways for reciprocation, a first motor carried by said base, a pair of racks on said slide parallel to said ways, a pair of pinions carried by said base in mesh with said racks, gearing interconnecting said motor and pinions, said gearing comprising a spline shaft, a pair of rigidly interconnected coaxial gears splined to said shaft and slidable longitudinally thereof, said gears and the splined connection thereof to said shaft including oppositely inclined helical torque-transmitting surface means arranged to provide for axial movement of said gears on said shaft into position such that substantially equal torque is transmitted through each of said gears, and separate gear trains connecting each of said gears to one of said pinions.

2. A machine tool as defined in claim 1 in which said rigidly interconnected gears are helical gears of opposite hand.

3. A machine tool as defined in claim 1 in which the splines connecting said rigidly interconnected gears to said spline shaft are helical.

4. A machine tool as defined in claim 1 in which said motor is an irreversible AC motor, clutch means for selectively coupling said motor to said gearing, and separate means independent of said motor for reversely actuating said gearing to move said slide in the opposite direction.

5. A machine tool as defined in claim 4 on which said separate means comprises a second motor.

6. A machine tool as defined in claim 1 in which said machine tool is a broaching machine, and in which said slide is moved by said first motor in a cutting stroke and by said second motor in an idle return stroke.

7. A machine tool as defined in claim 6 in which said guideways extend vertically on said base and said slide is a movable broach support.

8. A machine tool as defined in claim 7 comprising a work support post on said base having work locating and support means at its upper end.

9. A machine tool as defined in claim 8 comprising a generally tubular broach holder in said slide adapted to support an assembly of internal broach tools thereon movable over said post.

10. A machine tool as defined in claim 1 in which said rigidly interconnected gears are spur gears and in which the splined connection of the rigidly interconnected coaxial gears to the shaft comprises axially spaced splined sections of opposite hand.